US010291727B2

(12) United States Patent
Horie

(10) Patent No.: US 10,291,727 B2
(45) Date of Patent: May 14, 2019

(54) INFORMATION PROCESSING DEVICE, INFORMATION PROCESSING METHOD, PORTABLE TERMINAL, AND SERVER

(71) Applicant: Sony Computer Entertainment Inc., Tokyo (JP)

(72) Inventor: Kazuyoshi Horie, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 420 days.

(21) Appl. No.: 14/141,561

(22) Filed: Dec. 27, 2013

(65) Prior Publication Data

US 2014/0201284 A1 Jul. 17, 2014

(30) Foreign Application Priority Data

Jan. 11, 2013 (JP) ................................ 2013-003282

(51) Int. Cl.
*G06Q 10/10* (2012.01)
*H04L 12/58* (2006.01)
(Continued)

(52) U.S. Cl.
CPC ............. *H04L 67/18* (2013.01); *G06Q 10/10* (2013.01); *G06Q 50/01* (2013.01); *H04L 12/1818* (2013.01); *H04L 51/32* (2013.01)

(58) Field of Classification Search
CPC ......... G06Q 50/00; H04L 67/22; H04L 51/20; G06F 3/017; G06F 19/00; G06F 1/163; G06F 21/32; G06F 3/0317; G06F 3/0346; G06F 3/00; G06F 3/0304; G06F 3/0321; G06F 3/033; G06F 3/03545; G06F 3/0386; G06F 3/04812; G06F 3/04845
See application file for complete search history.

(56) References Cited

U.S. PATENT DOCUMENTS 7,667,686 B2 2/2010 Suh
8,831,639 B2 9/2014 Park
(Continued)

FOREIGN PATENT DOCUMENTS

JP 2009129257 A 6/2009
JP 2012234510 A 11/2012
(Continued)

OTHER PUBLICATIONS

Office Action for corresponding JP Application No. 2013-003282, 8 pages, dated Sep. 13, 2016.

*Primary Examiner* — Djenane M Bayard
(74) *Attorney, Agent, or Firm* — Matthew B. Dernier, Esq.

(57) ABSTRACT

There is provided a technique to assist operation in a social network system. An information processing device includes a motion data acquirer that acquires motion data of a user, a motion data comparator that compares the motion data acquired by the motion data acquirer with comparative motion data, and an operation executor that executes predetermined operation to social network service utilized by the user based on a comparison result of the motion data comparator. An information processing method includes acquiring motion data of a user, comparing the acquired motion data with comparative motion data, and executing predetermined operation to social network service utilized by the user based on a comparison result.

30 Claims, 10 Drawing Sheets

(51) Int. Cl.
*G06Q 50/00* (2012.01)
*H04L 12/18* (2006.01)
*H04L 29/08* (2006.01)

(56) References Cited

U.S. PATENT DOCUMENTS

2004/0102931 A1* 5/2004 Ellis .................... A61B 5/1038 702/188
2005/0278443 A1* 12/2005 Winner .................. G06Q 30/02 709/224
2007/0176898 A1 8/2007 Suh
2007/0211573 A1* 9/2007 Hermansson ... H04M 1/274516 367/99
2008/0070593 A1* 3/2008 Altman ................ H04L 63/102 455/457
2008/0233996 A1* 9/2008 Ogasawara ............. G06F 3/017 455/550.1
2009/0215015 A1* 8/2009 Chu .................. A46B 15/0006 434/238
2012/0252498 A1* 10/2012 Trinchero .............. H04W 4/02 455/456.3
2012/0253819 A1* 10/2012 Hasegawa .............. G10L 25/51 704/270
2012/0276929 A1 11/2012 Park
2012/0278410 A1* 11/2012 Chung .................. H04W 4/023 709/206
2013/0106603 A1* 5/2013 Weast ..................... G06F 1/163 340/539.11
2013/0106684 A1* 5/2013 Weast ................ G06F 19/3481 345/156
2013/0165045 A1* 6/2013 Cao ...................... H04W 4/206 455/41.2
2013/0165098 A1* 6/2013 Nakazawa ............ H04W 76/02 455/418
2013/0225309 A1* 8/2013 Bentley ............. G06K 9/00342 473/266
2013/0278501 A1* 10/2013 Bulzacki ................ G06F 3/017 345/157
2013/0335573 A1* 12/2013 Forutanpour ........... G06F 3/011 348/158
2014/0002338 A1* 1/2014 Raffa .................... G06F 1/1694 345/156
2014/0046922 A1* 2/2014 Crook ............... G06F 17/30648 707/706
2014/0064557 A1* 3/2014 Hara ....................... G06F 3/017 382/103
2014/0114561 A1* 4/2014 Pakzad ................ G01C 21/206 701/410
2014/0333211 A1 11/2014 Oka
2015/0324636 A1* 11/2015 Bentley .................. G11B 27/17 386/227

FOREIGN PATENT DOCUMENTS

JP 2012256378 A 12/2012
JP 2013156950 A 8/2013
JP 2014002611 A 1/2014
JP 2014500740 A 1/2014
WO 2012061438 A2 5/2012
WO 2013099629 A1 4/2015

* cited by examiner

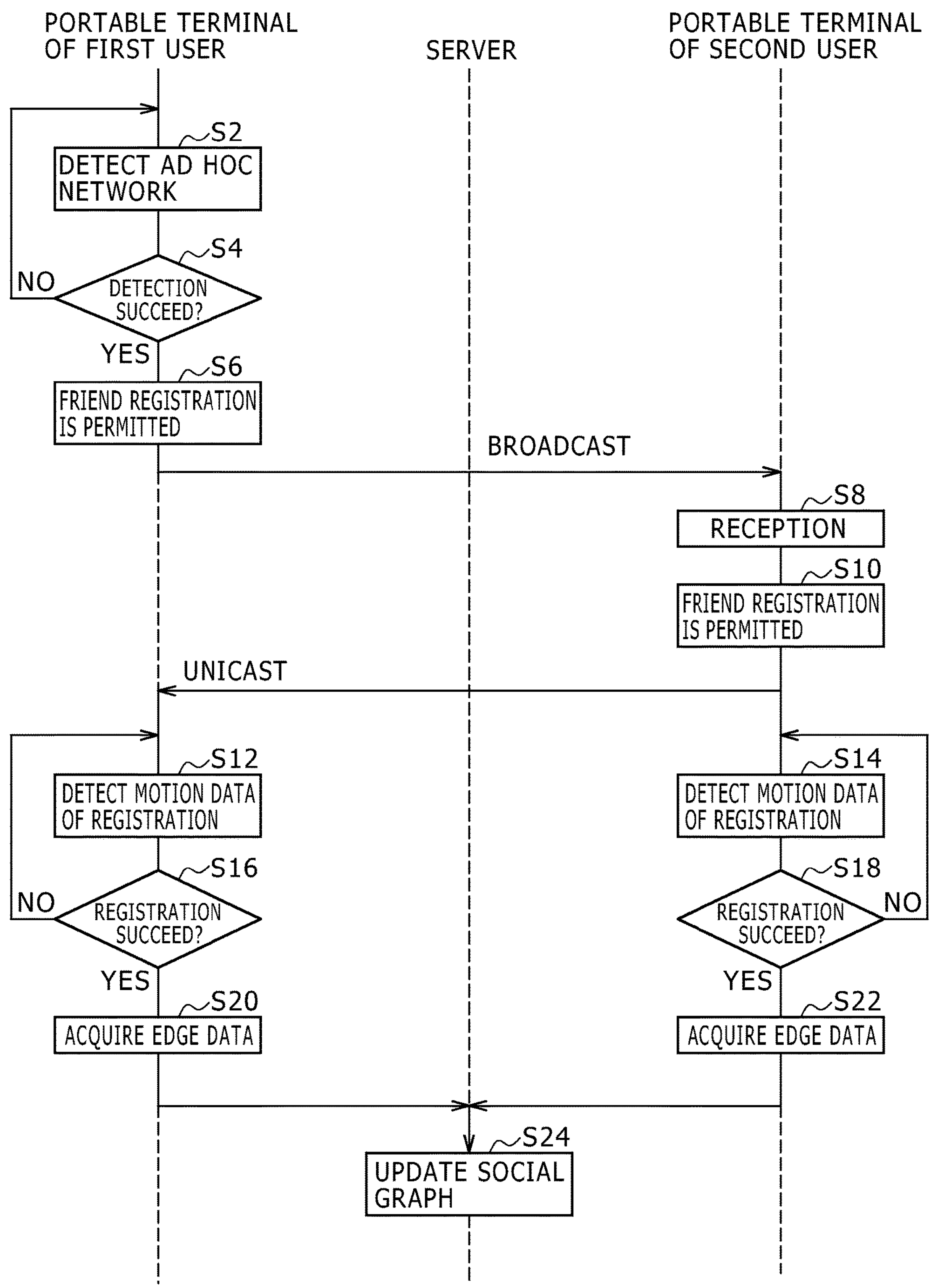
FIG. 7
PORTABLE TERMINAL OF FIRST USER
SERVER
PORTABLE TERMINAL OF SECOND USER
S2
DETECT AD HOC NETWORK
S4
DETECTION SUCCEED?
NO
YES
S6
FRIEND REGISTRATION IS PERMITTED
BROADCAST
S8
RECEPTION
S10
FRIEND REGISTRATION IS PERMITTED
UNICAST
S12
DETECT MOTION DATA OF REGISTRATION
S14
DETECT MOTION DATA OF REGISTRATION
S16
REGISTRATION SUCCEED?
NO
YES
S18
REGISTRATION SUCCEED?
NO
YES
S20
ACQUIRE EDGE DATA
S22
ACQUIRE EDGE DATA
S24
UPDATE SOCIAL GRAPH

| KIND OF MOTION DATA | SHAPE OF MOTION DATA |
| --- | --- |
| FIRST PATTERN | |
| SECOND PATTERN | |
| ⋮ | ⋮ |
| N-TH PATTERN | |

| MOTION PATTERN OF FIRST USER | MOTION PATTERN OF SECOND USER | CONTENT OF COMBINATION |
| --- | --- | --- |
| FIRST PATTERN | FIRST PATTERN | HANDSHAKE |
| SECOND PATTERN | SECOND PATTERN | HIGH FIVE |
| ⋮ | ⋮ | ⋮ |
| J-TH PATTERN | K-TH PATTERN | SALUTE OF FIRST USER TO SECOND USER |
| ⋮ | ⋮ | ⋮ |

INFORMATION PROCESSING DEVICE, INFORMATION PROCESSING METHOD, PORTABLE TERMINAL, AND SERVER

BACKGROUND

The present disclosure relates to an information processing device and an information processing method carried out in the information processing device, and particularly to a portable terminal and a server as the information processing device.

In recent years, a mechanism called social network service (SNS) for promoting connections among people has become explosively popular and a variety of mechanisms are provided. Such social network service frequently has a function to utilize position information of a user to add a connection with another user who is being present close to the user. As one example of such a function, there exists e.g. a function to display user's own QR code (registered trademark) on a screen and make it be read so that the user may be added as a friend in the social network service. Furthermore, there also exists social network service having a function to add a user as a friend by giving a motion to a smartphone utilized by the user. Moreover, so-called "check-in" to notify that a user is being present at a certain place on the SNS is also realized by operating a smartphone.

SUMMARY

In a situation in which actually persons become friends with each other, an action of reading each other's codes displayed on smartphones or shaking the smartphones for friend registration in social network service is not a very natural action. In addition, it is also a troublesome action. Also in the case of making the above-described check-in, operating a smartphone is cumbersome when the user who tries to make the check-in is with somebody else or in a hurry. If operation in a social network system can be realized by a natural action in a limited time, the convenience for the user who utilizes the social network system could be enhanced.

There is a need for the present disclosure to provide a technique assisting operation in a social network system.

According to an embodiment of the present disclosure, there is provided an information processing device. This device includes a motion data acquirer that acquires motion data of a user, a motion data comparator that compares the motion data acquired by the motion data acquirer with comparative motion data, and an operation executor that executes predetermined operation to social network service utilized by the user based on a comparison result of the motion data comparator.

According to another embodiment of the present disclosure, there is provided a portable terminal. This portable terminal includes a measuring part that is so configured as to be freely mounted on a first user and measures motion data of the user, an ad hoc communication section that acquires, via an ad hoc network, motion data obtained by measuring a motion of a second user who utilizes the same service as social network service utilized by the first user by a measuring part attached to the second user, and a time interval acquirer that acquires the time difference between a time when the measuring part has measured data and a time associated with the motion data of the second user acquired by the ad hoc communication section. This portable terminal further includes a motion data comparator that acquires whether or not the motion data of the first user and the motion data of the second user are similar if the time difference acquired by the time interval acquirer is within a predetermined time interval and an operation executor that executes predetermined operation to the social network service utilized by the first user and the second user in common if the motion data of the first user and the motion data of the second user are similar.

According to further another embodiment of the present disclosure, there is provided a server capable of communication with at least two portable terminals each possessed by a respective one of at least two users via a network. This server includes a motion data acquirer that acquires motion data of the user measured by each of the at least two portable terminals, a time interval acquirer that acquires the time interval between measurement times of motion data of different two users, and a distance acquirer that acquires the distance between locations of the different two users. This server further includes a motion data comparator that acquires whether or not the motion data of the different two users are similar if the time interval acquired by the time interval acquirer is within a predetermined time interval and the distance acquired by the distance acquirer is within a predetermined distance and an operation executor that executes predetermined operation to social network service utilized by the different two users in common if the motion data of the different two users are similar.

According to further another embodiment of the present disclosure, there is provided an information processing method. This method includes acquiring motion data of a user, comparing the acquired motion data with comparative motion data, and executing predetermined operation to social network service utilized by the user based on a comparison result.

According to further another embodiment of the present disclosure, there is provided a program that causes a computer to carry out the above-described method.

This program may be provided as part of firmware incorporated in apparatus for basic control of video, audio, and hardware resources such as game machine, smartphone, and wristwatch. This firmware is stored in e.g. a semiconductor memory such as a read only memory (ROM) in apparatus or a flash memory. To provide this firmware or update part of the firmware, a computer-readable recording medium in which this program is recorded may be provided and this program may be transmitted by a communication line.

What are obtained by translating arbitrary combinations of the above constituent elements and expressions of the present disclosure among method, device, system, computer program, data structure, recording medium, and so forth are also effective as an embodiment of the present disclosure.

According to the embodiments of the present disclosure, a technique to assist operation in a social network system can be provided.

BRIEF DESCRIPTION OF THE DRAWINGS

FIG. 7 is a sequence diagram for explaining the flow of information processing in the social network system according to the embodiment;

FIG. 13 is a diagram schematically showing the data structure of a comparison database in which comparative motion data are stored according to the embodiment; and FIG. 14 is a diagram schematically showing the data structure of a combination pattern database in which combinations of patterns of motion data are stored according to the embodiment.

DETAILED DESCRIPTION OF THE PREFERRED EMBODIMENT

Figure 1:
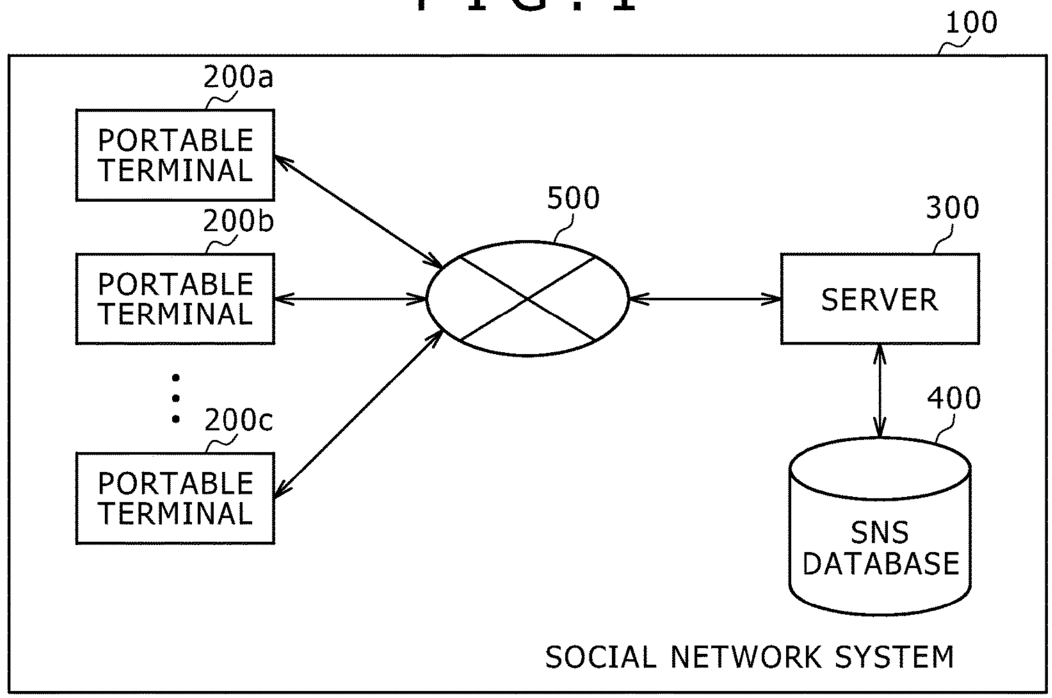
FIG. 1 is a diagram schematically showing the overview of the whole configuration of a social network system according to an embodiment.

FIG. 1 is a diagram schematically showing the overview of the whole configuration of a social network system 100 according to an embodiment. With reference to FIG. 1, the outline of the social network system 100 according to the embodiment will be described.

The social network system 100 according to the embodiment includes portable terminals 200*a*, 200*b*, and 200*c* referred to collectively as the portable terminal 200, a server 300 communicably connecting to the portable terminal 200 via a network 500, and an SNS database 400. Although the three portable terminals 200*a*, 200*b*, and 200*c* are shown in FIG. 1, the number of portable terminals included in the social network system 100 is not limited to three and may be larger or smaller than three.

The social network system 100 according to the embodiment is realized by using a cloud computing technique. The social network system 100 provides social network services such as provision of application and storage on demand via the network 500. From the viewpoint of the user who utilizes the portable terminal 200 receiving provision of services from the social network system 100, the user does not need to understand the physical configuration, software configuration, and so forth of the social network system 100 for receiving the provision of services and is given an impression as if the user utilized services coming out from a cloud of networks.

The portable terminal 200 has computing resources such as a central processing unit (CPU) in most cases and can also execute at least part of an application in a local environment of the portable terminal 200. However, for the user who utilizes the portable terminal 200, it is not an important issue whether an application is executed by local computing resources or executed by computing resources of the social network system 100 on the network and these cases are the same in that services can be utilized. Therefore, in the present specification, in the case of stating "computing resources of the social network system" or simply "computing resources," this means at least either one of computing resources of the portable terminal 200 and computing resources of the server 300 or the like of the social network system 100.

Suppose that, in FIG. 1, a user A possesses the portable terminal 200*a* and a user B different from the user A possesses the portable terminal 200*b*. When the user A and the user B face each other to greet each other and shake hands, the portable terminal 200*a* and the portable terminal 200*b* are triggered to acquire motion data of the user A and motion data of the user B, respectively, by audio information issued by the user A or the user B.

Computing resources of the social network system 100 make a comparison as to whether or not the acquired motion data of the user A and the acquired motion data of the user B are similar. If the motion data of the user A and the user B are similar as the result of the comparison, the computing resources execute predetermined operation to social network service utilized by the user A and the user B in common.

When the user A and the user B shake hands, the motions of the hand parts of the user A and the user B at this time will be similar. Therefore, if the motion data of the user A and the motion data of the user B are similar as the result of the above-described comparison, it can be determined that the probability of facing of the user A and the user B is high. So, the computing resources execute e.g. operation of linking the relationship between the user A and the user B, i.e. operation of so-called "friend registration," in the social network service utilized by the user A and the user B in common. This allows the user A and the user B to realize the operation of the social network service in a natural action such as greeting and handshake without operating the portable terminal 200.

The following description will be made on the premise that the different portable terminals 200 construct a wireless ad hoc network to perform ad hoc communication when existing across a short distance from each other.

Figure 2:
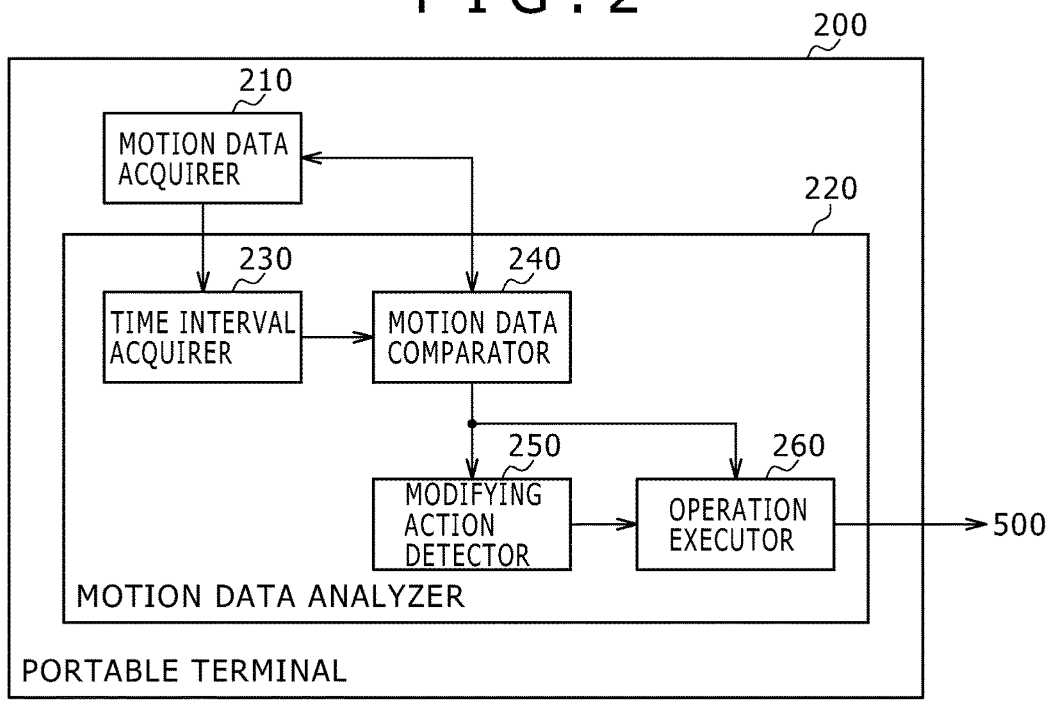
FIG. 2 is a diagram schematically showing the internal configuration of a portable terminal according to the embodiment.

FIG. 2 is a diagram schematically showing the internal configuration of the portable terminal 200 according to the embodiment. The portable terminal 200 according to the embodiment includes a motion data acquirer 210 and a motion data analyzer 220.

The motion data acquirer 210 acquires motion data of the user possessing the portable terminal 200. Furthermore, from another portable terminal 200 communicating with the portable terminal 200 via the ad hoc network, the motion data acquirer 210 also acquires motion data of another user possessing this portable terminal 200. The motion data acquirer 210 can be realized by using e.g. known low-g acceleration sensor and wireless communication module. Hereinafter, for convenience of description, the user possessing the portable terminal 200 will be described as the "first user" and another user possessing another portable terminal 200 communicating via the ad hoc network will be described as the "second user." Details of the motion data acquirer 210 will be described later.

The motion data analyzer 220 analyzes the motion data of the two users acquired by the motion data acquirer 210. Based on the analysis result, the motion data analyzer 220 executes predetermined operation in the social network service utilized by the two users in common. For this purpose, the motion data analyzer 220 includes a time interval acquirer 230, a motion data comparator 240, a modifying action detector 250, and an operation executor 260.

The time interval acquirer 230 acquires the time interval of times associated with the respective motion data of the two users acquired by the motion data acquirer 210. Here, the "time associated with motion data" is e.g. a time stamp stored, as metadata, in the header of a file storing the motion data. Details of the "time associated with motion data" will be described in later explanation of the motion data acquirer 210.

The motion data comparator 240 makes a comparison as to whether or not the motion data of the two users acquired by the motion data acquirer 210 are similar. If the time interval acquired by the time interval acquirer 230 is within a predetermined time interval, the motion data comparator 240 may make a comparison as to whether or not the motion data of the two users are similar. Here, the "predetermined time interval" is a reference interval for determination as to facing, defined in order to determine whether or not the first user and the second user have actually faced each other. The reference interval for facing determination can be defined based on an experiment in consideration of the kind of executed operation of social network service and so forth, and is e.g. three minutes.

When the first user and the second user have actually faced each other, the time stamps of the motion data of the two users will show close times. Therefore, if the interval between the time stamp of the motion data of the first user and the time stamp of the motion data of the second user is wider than the reference interval for facing determination, the possibility that the first user and the second user have actually faced each other will be low. So, the motion data comparator 240 makes a comparison as to whether or not the motion data of the two users are similar if the time interval acquired by the time interval acquirer 230 is within the predetermined time interval. This can suppress the load on the computing resources and the communication cost. Furthermore, the power consumption of the portable terminal 200 can also be suppressed.

The operation executor 260 executes predetermined operation to the social network service utilized by these two users based on the comparison result of the motion data comparator 240. Specifically, if the motion data of the first user and the motion data of the second user are similar, the operation executor 260 executes the predetermined operation to the social network service utilized by these two users in common. More specifically, the operation executor 260 instructs the server 300 to execute the operation via the network 500. In accordance with the instruction by the operation executor 260, the server 300 updates graph data relating to the first user and the second user in the SNS database 400. The modifying action detector 250 detects whether the first user has carried out an operation modifying action defined in order to decide whether or not to modify operation by the operation executor 260 when the first user desires to add a modification to the operation executed by the operation executor 260. The modifying action will be described later.

In this manner, the portable terminal 200 according to the embodiment detects the motion of the user who utilizes the portable terminal 200. However, actions carried out by a person in interpersonal involvement have a wide variety. The above-described handshake is also one example thereof. Besides, various kinds of actions such as high five, hug, bow, utterance, and cocking of the head are cited. Any motion of the user may be turned to data as the motion data acquired by the motion data acquirer 210 according to the embodiment. In the following, as one example, the case in which the motion of a hand part of the user is turned to data as the motion data will be described.

Figure 3:
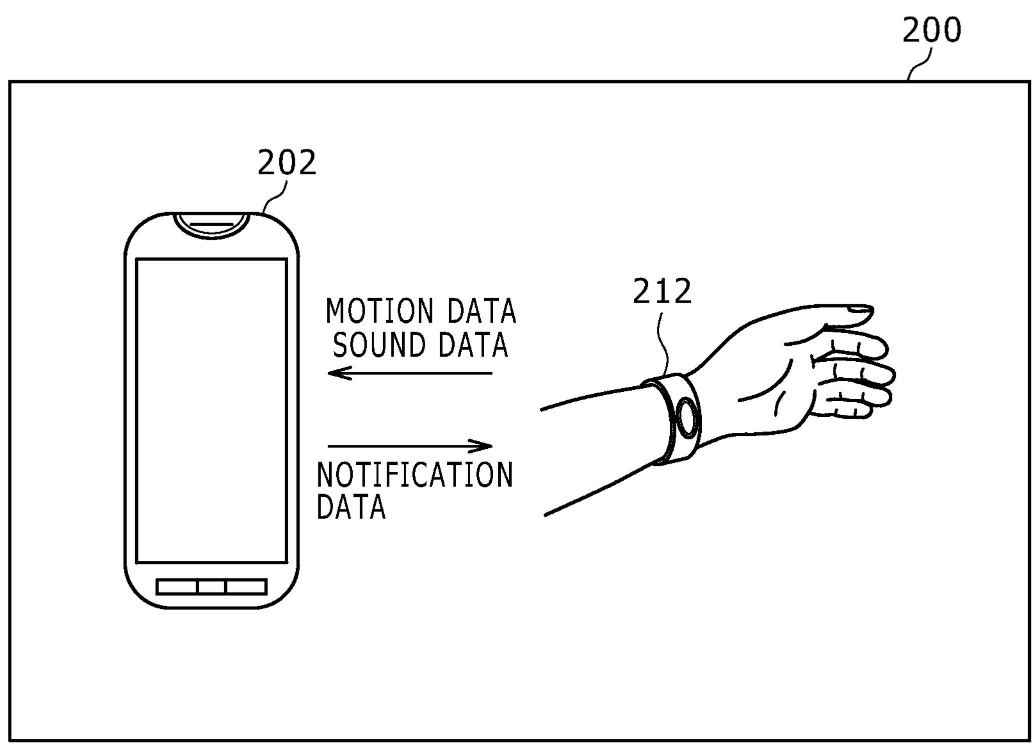
FIG. 3 is a diagram schematically showing one example of the appearance of the portable terminal according to the embodiment.

FIG. 3 is a diagram schematically showing one example of the appearance of the portable terminal 200 according to the embodiment. In the example shown in FIG. 3, the portable terminal 200 includes a smartphone 202 and a measuring part 212 of a wristband type. To enhance the accuracy of turning the motion of a hand part of the user to data, the measuring part 212 is so configured as to be freely mounted on a wrist of the user independently of the smartphone 202. The form of the measuring part 212 is not limited to the wristband and may be any as long as it can be mounted on the user and measure the motion of the user. Examples of the form include eyeglasses, necklace, and hair accessory.

Figure 4:
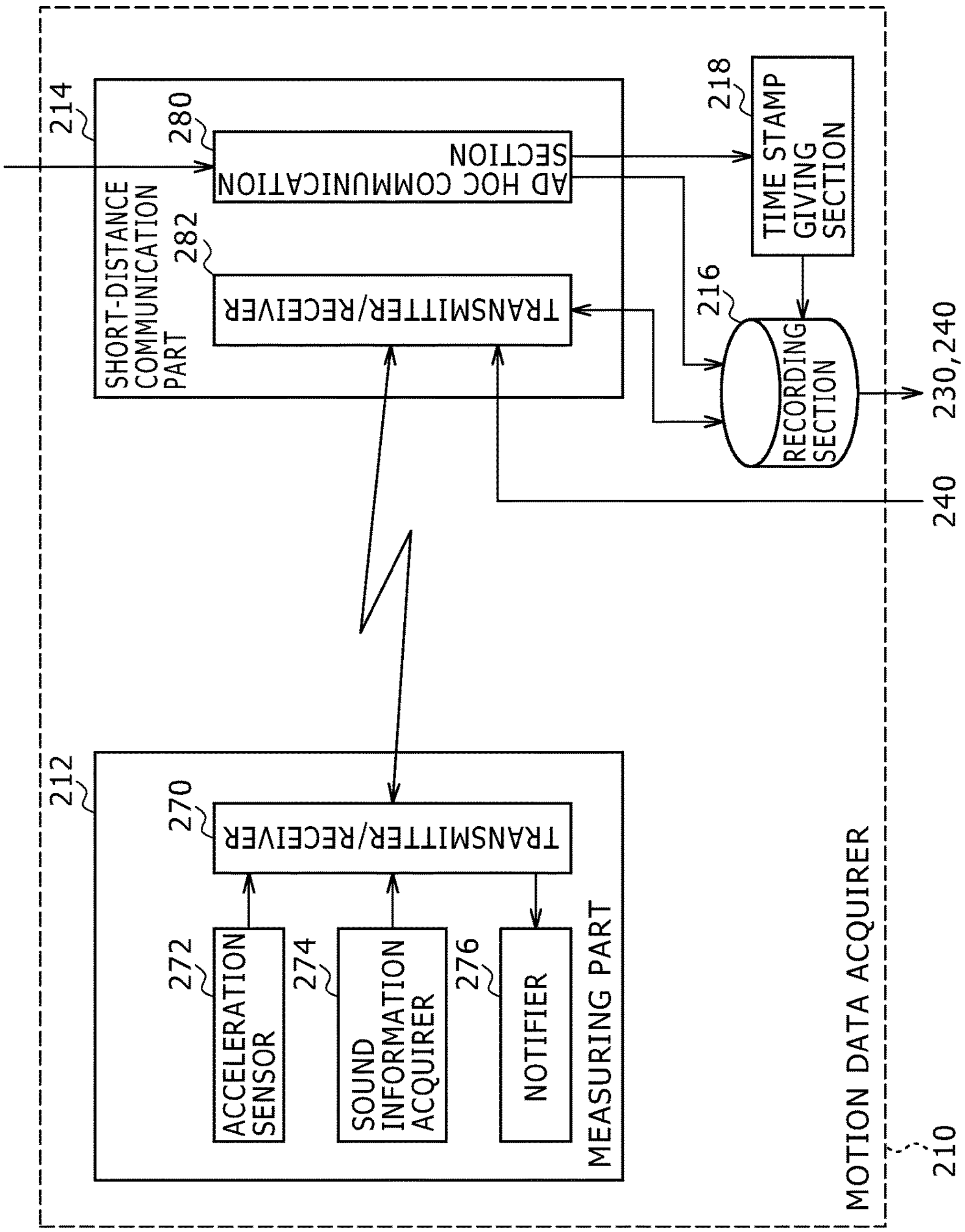
FIG. 4 is a diagram schematically showing the functional configuration of a motion data acquirer according to the embodiment.

FIG. 4 is a diagram schematically showing the internal configuration of the motion data acquirer 210 according to the embodiment. The motion data acquirer 210 includes the measuring part 212 of the wristband type mounted on a wrist of the user and a short-distance communication part 214, a recording section 216, and a time stamp giving section 218 that are included in the smartphone 202. In this manner, the motion data acquirer 210 exists over both the above-described smartphone 202 and the wristband-type measuring part 212 and transmits and receives data by using short-distance wireless communication.

The measuring part 212 measures motion data of a hand part of the user to transmit it to the smartphone 202, and notifies the user of information acquired from the smartphone 202. For this purpose, the measuring part 212 includes a transmitter/receiver 270, an acceleration sensor 272, a sound information acquirer 274, and a notifier 276.

The acceleration sensor 272 acquires motion data of a hand part of the user as acceleration data. The sound information acquirer 274 acquires sound information around the measuring part 212, including utterance of the first user and the second user, as waveform data. The sound information acquirer 274 can be realized by using a known microphone.

The transmitter/receiver 270 wirelessly transmits the motion data acquired by the acceleration sensor 272 and the waveform data acquired by the sound information acquirer 274 to the short-distance communication part 214 included in the smartphone 202. Furthermore, the transmitter/receiver 270 acquires information from the motion data analyzer 220 via the short-distance communication part 214 included in the smartphone 202. One example of the information acquired from the motion data analyzer 220 is e.g. information indicating that motion data of the first user and the second user are dissimilar as the comparison result by the motion data comparator 240.

The notifier 276 makes a notification in a notification mode set according to information acquired from the motion data analyzer 220 via the transmitter/receiver 270. Specifically, the notifier 276 blinks an LED (not shown) and generates a beep sound. This can give the user e.g. an awareness that the user needs to shake hands again.

The short-distance communication part 214 in the smartphone 202 stores, in the recording section 216, motion data and waveform data wirelessly transmitted from the transmitter/receiver 270 in the measuring part 212. At this time, the time stamp giving section 218 includes a clock (not shown) and stores, in the recording section 216, the time when the acceleration sensor 272 or the sound information acquirer 274 has acquired the data in association with this data. The recording section 216 stores also information to be notified to the notifier 276 in the measuring part 212 besides the data acquired from the short-distance communication part 214.

If the portable terminal 200 used by the second user who utilizes the same service as the social network service utilized by the first user exists at a short distance, an ad hoc communication section 280 constructs an ad hoc network with this portable terminal. The ad hoc communication section 280 acquires, via the ad hoc network, motion data obtained by measuring the motion of the second user by a measuring part included in the portable terminal 200 used by the second user.

In general, there is no guarantee that the clock in the portable terminal 200 used by the first user synchronizes with the clock in the portable terminal 200 used by the second user. Either or both of the clocks are fast or slow in some cases and it is also possible that the time zones of both clocks are different. So, the time stamp giving section 218 stores, in the recording section 216, the time when the ad hoc communication section 280 has acquired motion data of the second user in association with the motion data of the second user.

Due to this, the time associated with the motion data of the first user and the time associated with the motion data of the second user are both a time given by the same time stamp giving section 218. As a result, the above-described time interval acquirer 230 acquires the time difference between the time when the acceleration sensor 272 has acquired the motion data of the first user and the time when the ad hoc communication section 280 has acquired the motion data of the second user via the ad hoc network. Due to this, even if the clock in the portable terminal 200 used by the first user and the clock in the portable terminal 200 used by the second user are out of synchronization, the above-described motion data comparator 240 can compare the time associated with the motion data of the first user with the time associated with the motion data of the second user on the same basis.

The motion data comparator 240 may be triggered to compare the motion data of the first user with the motion data of the second user by that the gain of sound information acquired by the sound information acquirer 274 and stored in the recording section 216 surpasses a predetermined threshold. Here, the "predetermined threshold" is a reference threshold of the sound volume defined in order for the motion data comparator 240 to decide whether or not to compare the motion data of the first user with the motion data of the second user. The reference threshold of the sound volume can be defined based on an experiment in consideration of the performance of the sound information acquirer 274 and so forth.

Figure 5:
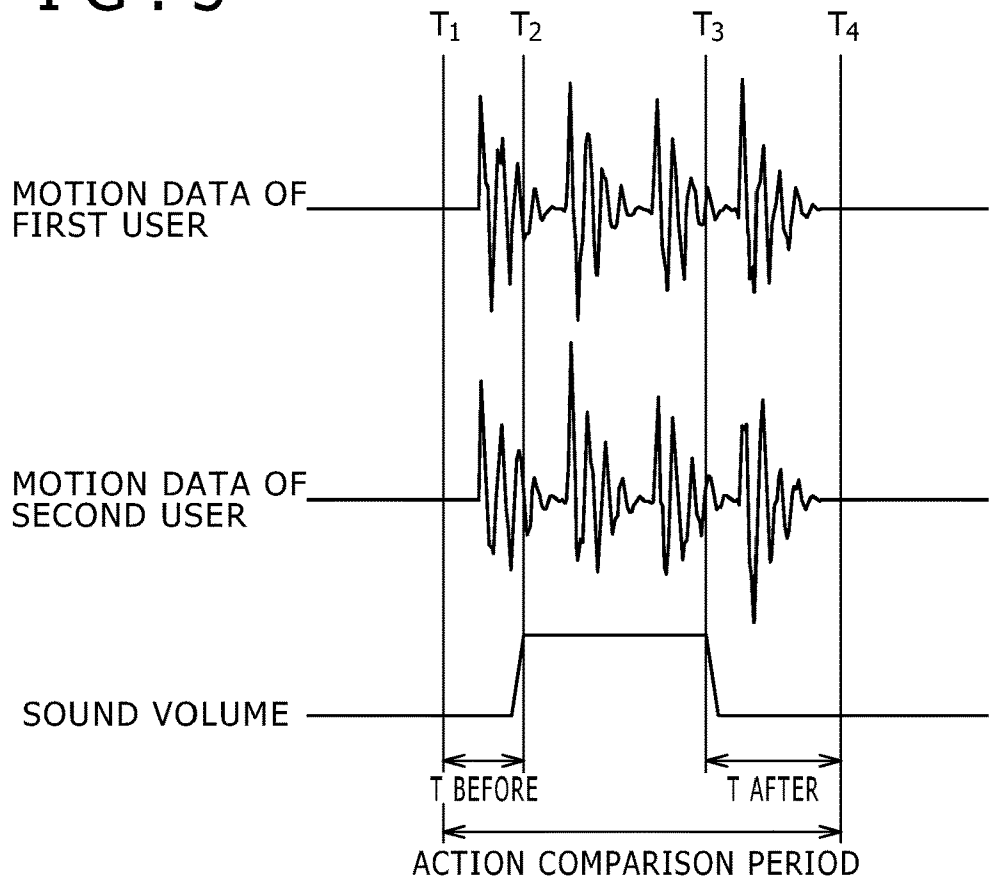
FIG. 5 is a diagram schematically showing one example of the shapes of data acquired by an acceleration sensor and a sound information acquirer according to the embodiment.

FIG. 5 is a diagram schematically showing one example of the shapes of data acquired by the acceleration sensor 272 and the sound information acquirer 274 according to the embodiment. The example shown in FIG. 5 is a diagram showing motion data and sound data of the first user and the second user when they face each other to shake hands with greeting.

This greeting is e.g. "nice to meet you" or "hello." This greeting is detected by the sound information acquirer 274 in the portable terminal 200 possessed by each of the first user and the second user. Because the first user and the second user will make utterance almost simultaneously in most cases, generally it will be difficult to carry out speech-recognition of the content of the greeting from the waveform data of sound information. So, it is enough for the motion data comparator 240 to detect only the intensity of sound larger than the reference threshold of the sound volume from the sound information acquired by the sound information acquirer 274.

In the example shown in FIG. 5, a period from $T_1$ to $T_4$ is defined as an action comparison period. $T_1$ is a time previous by a certain time $T_{before}$ to $T_2$, at which the sound information becomes larger than the reference threshold of the sound volume. $T_4$ is a time subsequent by a certain time $T_{after}$ to $T_3$, at which the sound information becomes smaller than the reference threshold of the sound volume. The motion data comparator 240 makes a comparison as to whether or not the motion data of the first user and the motion data of the second user in this action comparison period are similar.

Figure 6:
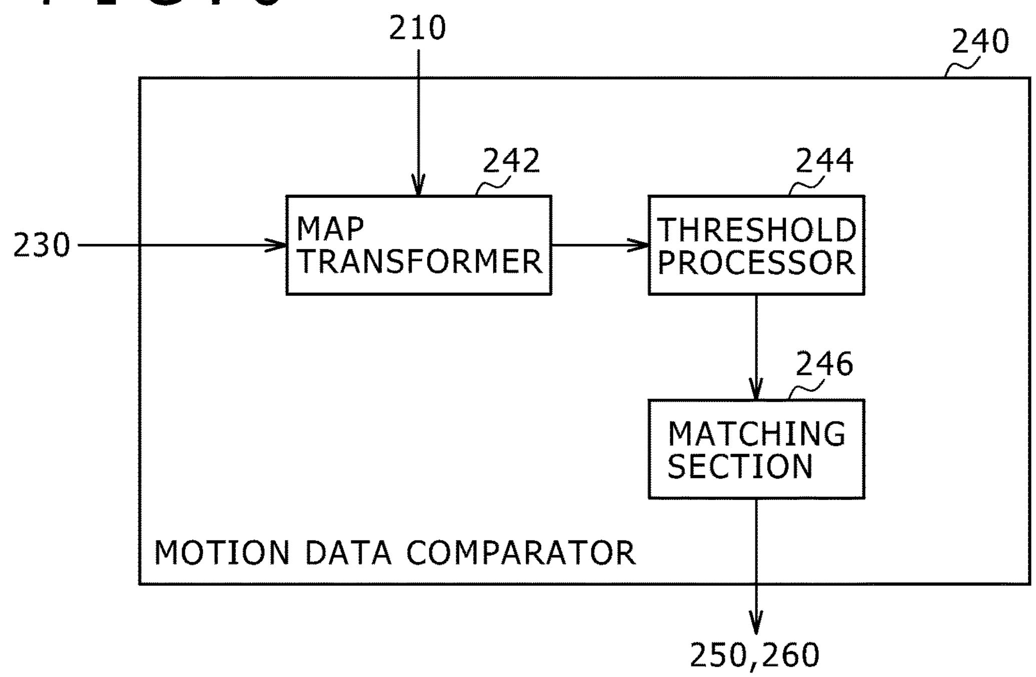
FIG. 6 is a diagram schematically showing the internal configuration of a motion data comparator according to the embodiment.

FIG. 6 is a diagram schematically showing the internal configuration of the motion data comparator 240 according to the embodiment. The motion data comparator 240 includes a map transformer 242, a threshold processor 244, and a matching section 246.

To the map transformer 242, motion data of different two users, such as motion data of the first user and motion data of the second user, are input. If the motion data of these two users are similar, the map transformer 242 outputs a smaller real value compared with the case in which they are dissimilar. To realize this, the map transformer 242 utilizes e.g. an algorithm of dynamic programming (DP) matching. The algorithm of the DP matching will be briefly described below.

A vector including, as elements, discrete data made by arranging motion data of the first user in a time-series manner is represented as a vector A, and a vector including, as elements, discrete data made by arranging motion data of the second user in a time-series manner is represented as a vector B. Specifically, they are expressed as follows.

$$A=[a_1,a_2, \ldots ,a_I] \tag{1}$$

$$B=[b_1,b_2, \ldots ,b_J] \tag{2}$$

In these expressions, I and J are the data lengths of the vectors A and B, respectively. Furthermore, $a_i$ and $b_j$ represent acceleration vectors of the first user and the second user at time i and time j, respectively. Specifically, they are expressed as follows.

$$a_i = \begin{pmatrix} x_a(i) \\ y_a(i) \\ z_a(i) \end{pmatrix}, \quad b_i = \begin{pmatrix} x_b(j) \\ y_b(j) \\ z_b(j) \end{pmatrix} \tag{3}$$

In these expressions, x, y, and z represent values of the x-axis, y-axis, and z-axis of the acceleration sensor 272. Furthermore, when the Euclidean distance between the acceleration vector $a_i$ and the acceleration vector $b_j$ is defined as d(i, j), it is expressed as shown by the following expression (4).

$$\begin{aligned} d(i, j) &= \|a_i - b_j\| \\ &= \sqrt{d_x^2(i, j) + d_y^2(i, j) + d_z^2(i, j)} \end{aligned} \tag{4}$$

wherein $$d_x(i, j) = x_a(i) - x_b(j) \tag{5}$$

-continued $$d_y(i,j)=y_a(i)-y_b(j) \quad (6)$$

$$d_z(i,j)=z_a(i)-z_b(j) \quad (7)$$

At this time, the distance D(A, B) between two patterns is obtained by the following DP matching algorithm.

$$D(A,B)=g(I,J)/(I+J) \quad (8)$$

wherein $$g(0,0)=0$$

$$g(i,0)=g(0,j)=\infty \quad (9)$$

$$g(i,j)=\min\left\{\begin{array}{c} g(i-1,j)+d(i,j) \\ g(i-1,j-1)+2d(i,j) \\ g(i,j-1)+d(i,j) \end{array}\right\} \quad (10)$$

$$(i=1,\ldots,I;\ j=1,\ldots,J)$$

This distance D(A, B) is the real value output by the above-described map transformer 242. When the value of the distance D with a combination of certain two data is smaller than that of the distance D with a combination of other two data, it can be determined that these data are similar than when the value is larger.

Return to the description of FIG. 6. The threshold processor 244 compares the real value output by the map transformer 242 with a predetermined threshold to acquire combinations of motion data about which the real value output by the map transformer 242 is smaller than a similarity decision threshold. Here, the "predetermined threshold" is the similarity decision threshold defined in order to decide whether or not motion data of different two users are similar. The specific value of the similarity decision threshold can be defined based on an experiment in consideration of true positive (TP) and false positive (FP) in the matching and so forth.

If the real value output by the map transformer 242 is smaller than the similarity decision threshold, it can be determined that motion data of different two users are similar. So, the matching section 246 outputs information indicating that the motion data are similar when the real value output by the map transformer 242 is smaller than the similarity decision threshold, and output information indicating that they are dissimilar if not so. From the above, the motion data comparator 240 can make a comparison as to whether or not the motion data of different two users, such as motion data of the first user and motion data of the second user, are similar.

The algorithm used by the motion data comparator 240 for making a comparison as to whether or not the motion data of different two users are similar is not limited to the DP matching. Any algorithm may be employed as long as it is one in which motion data of two users are treated as an input to quantify the similarity thereof. Examples of such other algorithms include the hidden Markov model (HMM).

If motion data of different two users are dissimilar, the motion data comparator 240 notifies the motion data acquirer 210 of that they are dissimilar. When receiving the notification that the motion data are dissimilar, the notifier 276 in the motion data acquirer 210 makes a notification by using predetermined visual information or audio information defined in order to convey that effect to the first user. Here, the predetermined visual information is e.g. blinking an LED with a warning color such as red or yellow. The predetermined audio information is e.g. issuing a beep sound.

FIG. 7 is a sequence diagram for explaining the flow of information processing in the social network system 100 according to the embodiment.

The portable terminal 200*a* of the first user attempts to detect an ad hoc network (S2). If the ad hoc network cannot be detected (N of S4), the portable terminal 200*a* of the first user returns to the step S2 to continue the detection of the ad hoc network.

When the portable terminal 200*a* of the first user enters a range in which the ad hoc network can be constructed with any portable terminal 200 and succeeds in the detection of the ad hoc network (Y of S4), the portable terminal 200*a* of the first user becomes a state of being capable of friend registration (S6), and issues a broadcast to the ad hoc network.

When receiving the broadcast of the portable terminal 200*a* of the first user (S8), the portable terminal 200*b* of the second user also becomes a state of being capable of friend registration (S10), and issues a unicast to the portable terminal 200*a* of the first user.

The two users, who have learned of that they are capable of "friend registration," perform an action defined to carry out the "friend registration" by doing a handshake or high five with the hands on which the measuring parts 212 are mounted. Because these actions are common actions when persons meet each other, the user can perform the actions without being aware of the portable terminal 200 such as the smartphone 202. The portable terminal 200*a* of the first user acquires motion data and attempts to detect motion data of the friend registration (S12). The portable terminal 200*b* of the second user also acquires motion data similarly and attempts to detect motion data of the friend registration (S14). While the friend registration is not successful (N of S16), the portable terminal 200*a* of the first user returns to the step S12 to continue the detection of motion data of the friend registration. Similarly, while the friend registration is not successful (N of S18), the portable terminal 200*b* of the second user also returns to the step S14 to continue the detection of motion data of the friend registration.

When the friend registration succeeds (Y of S16), the portable terminal 200*a* of the first user acquires edge data between the first user and the second user (S20). Similarly, when the friend registration succeeds (Y of S18), the portable terminal 200*b* of the second user also acquires edge data between the first user and the second user (S22). Here, the "edge data" denotes data of one person-to-one person configuring a social graph and is data of first user-to-second user in this example.

Upon acquiring the edge data, the portable terminal 200*a* of the first user and the portable terminal 200*b* of the second user transmit the edge data to the server 300. The server 300 updates the social graph stored in the SNS database 400 based on the received edge data (S24). The server 300 can update the social graph in social network service utilized by a large number of users in common by being triggered to update the social graph by reception of edge data from a pair of portable terminals 200.

By the way, in the case of carrying out control based on whether or not motion data are similar, alternative control as to whether or not to execute predetermined operation is carried out. Here, for example if friend registration is assumed as the predetermined operation, it is convenient that the level of the "friend" can also be specified. So, the modifying action detector 250 analyzes motion data of the first user acquired by the measuring part 212 in the motion data acquirer 210 in predetermined time after execution of operation by the operation executor 260. Specifically, the modifying action detector 250 detects whether or not the motion data of the first user is similar to the operation modifying action defined in order to decide whether or not to modify the operation by the operation executor 260.

If the modifying action detector 250 detects motion data similar to the operation modifying action, the operation executor 260 executes predetermined modifying operation to the social network service utilized by the first user and the second user in common. Here, the "predetermined modifying operation" refers to operation of changing the level of the operation executed by the operation executor 260. For example, when the operation executor 260 executes operation of friend registration between the first user and the second user, the first user might desire registration as a "close friend." In such a case, the first user performs an action for modifying the friend registration to close friend registration in a predetermined time (e.g. within 10 minutes). Alternatively, it is also possible that actually the first user does not desire friend registration with the second user although the first user did a handshake with the second user out of politeness. In such a case, the first user performs an action for canceling the friend registration in a predetermined time (e.g. within 30 minutes).

As above, in the present embodiment, cancel operation to cancel previously-executed operation is also included in the "predetermined modifying operation." The action for the modification can be decided in advance depending on the purpose. An example thereof is an action of swinging the right palm made parallel to the ground three times. Furthermore, providing the predetermined time can prevent the situation in which the action for the modification is accidentally detected and modifying operation is executed after the elapse of this time.

The above description is made based on the premise that the different portable terminals 200 construct a wireless ad hoc network to perform ad hoc communication when existing at a short distance from each other. This is an example of the case in which computing resources to carry out comparison of motion data and so forth are the portable terminal 200 used by the user. As described above, for the user who utilizes the portable terminal 200, it is not an important issue whether an application is executed by local computing resources or executed by computing resources of the social network system 100 on the network. So, in the following, description will be made about the case in which a motion data analyzer 320 equivalent to the above-described motion data analyzer 220 exists in the server 300 and computing resources of the server 300 carry out comparison of motion data and so forth. Part overlapping with the already-made explanation is accordingly omitted or described with simplification.

Figure 8:
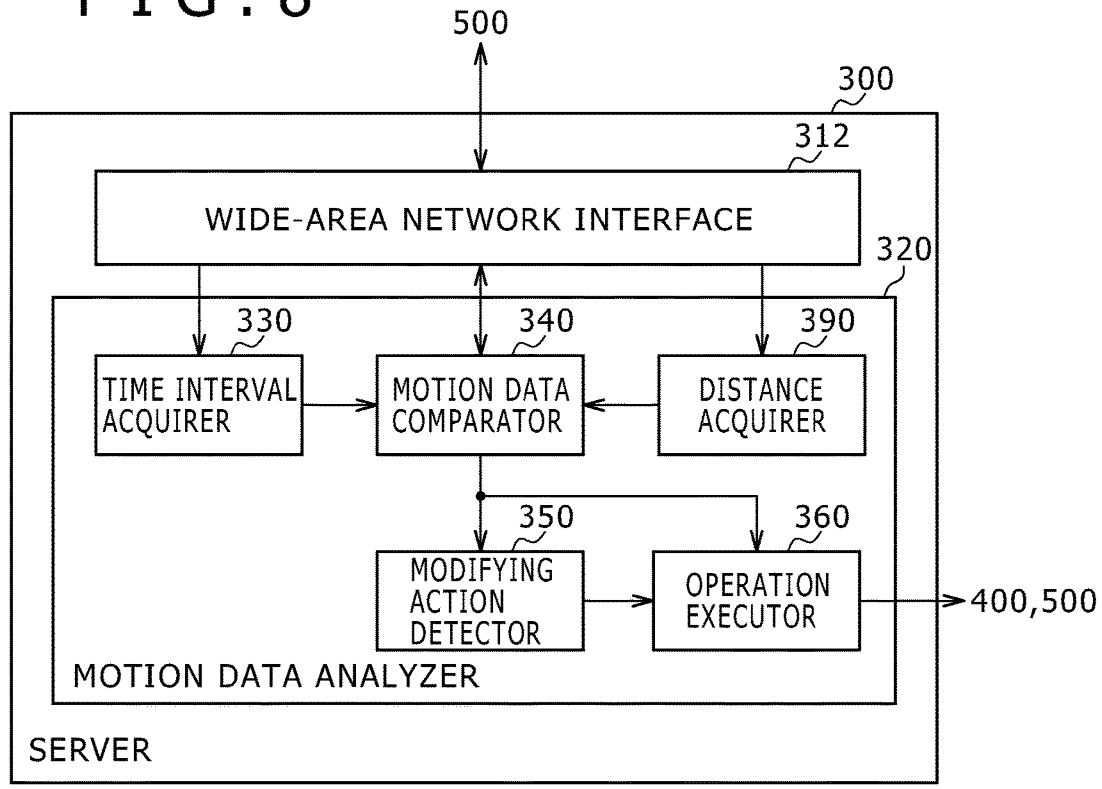
FIG. 8 is a diagram schematically showing the internal configuration of a server according to the embodiment.

FIG. 8 is a diagram schematically showing the internal configuration of the server 300 according to the embodiment. The server 300 according to the embodiment includes a wide-area network interface 312 and the motion data analyzer 320.

Similarly to the motion data analyzer 220 in the above-described portable terminal 200, the motion data analyzer 320 includes a time interval acquirer 330, a motion data comparator 340, a modifying action detector 350, and an operation executor 360. Differently from the motion data analyzer 220, the motion data analyzer 320 further includes a distance acquirer 390.

The wide-area network interface 312 communicates with the two or more portable terminals 200 each possessed by a respective one of at least two users via the network 500. The motion data comparator 340 acquires motion data of the users measured by each of the two or more portable terminals 200 via the wide-area network interface 312. The distance acquirer 390 acquires the locations of the users when each of the two or more portable terminals 200 measures the motion data. Based on the acquired locations, the distance acquirer 390 acquires the distance between the locations of the different two users.

The time interval acquirer 330 acquires the time interval between the measurement times of the motion data of the different two users. The motion data comparator 340 makes a comparison as to whether or not the motion data of these two users are similar if the time interval acquired by the time interval acquirer 330 is within a predetermined time interval and the distance acquired by the distance acquirer 390 is within a predetermined distance. If the motion data of these two users are similar, the operation executor 360 executes predetermined operation to the social network service utilized by these two users in common.

Figure 9:
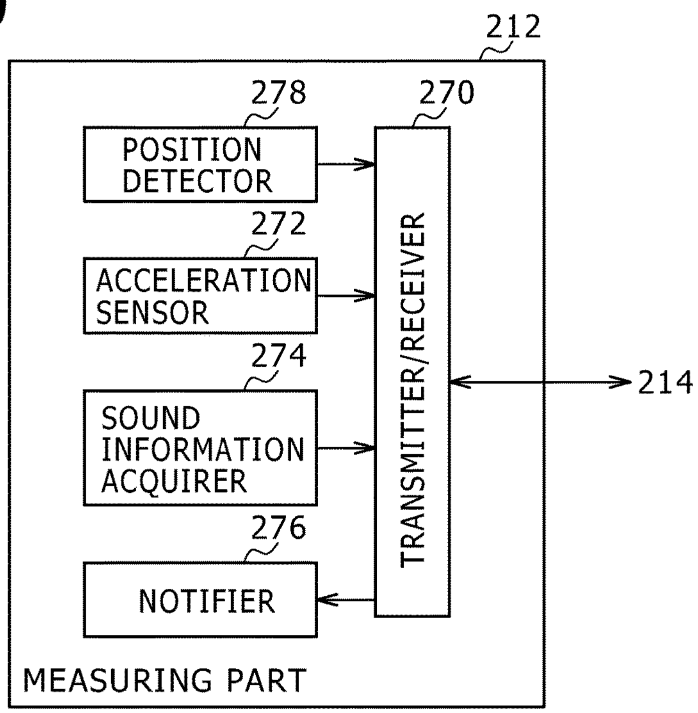
FIG. 9 is a diagram schematically showing the internal configuration of a measuring part according to the embodiment.

FIG. 9 is a diagram schematically showing the internal configuration of the measuring part 212 according to the embodiment. Specifically, it is an internal configuration diagram of the measuring part 212 in the case in which computing resources of the server 300 carry out comparison of the motion data and so forth. The measuring part 212 according to the embodiment includes a position detector 278 in addition to the transmitter/receiver 270, the acceleration sensor 272, the sound information acquirer 274, and the notifier 276.

As described above, the distance acquirer 390 acquires the distance between the locations of different two users. So, the position detector 278 acquires position information of the place where the portable terminal 200 incorporating the position detector 278 exists. The position detector 278 can be realized by using e.g. a known global positioning system (GPS) module. The position information acquired by the position detector 278 is transmitted to the server 300 via the transmitter/receiver 270 and the network 500.

Return to the description of FIG. 8. Because the time interval acquirer 330 exists in the server 300, it is difficult to directly measure the time when the portable terminal 200 has measured motion data. Furthermore, because the time interval acquirer 330 acquires motion data via the network 500, the time when the data is acquired depends on the time when the portable terminal 200 has transmitted the data. Even if it is ensured that each portable terminal 200 transmits data simultaneously with measuring the data, there is no guarantee that delay does not arise in the data transmission depending on the band of the network 500. So, differently from the above-described time interval acquirer 230, the time interval acquirer 330 acquires the time difference of the times when the respective portable terminals 200 have measured motion data based on times given by the respective portable terminals 200 at the time of the measurement of the motion data.

Figure 10:
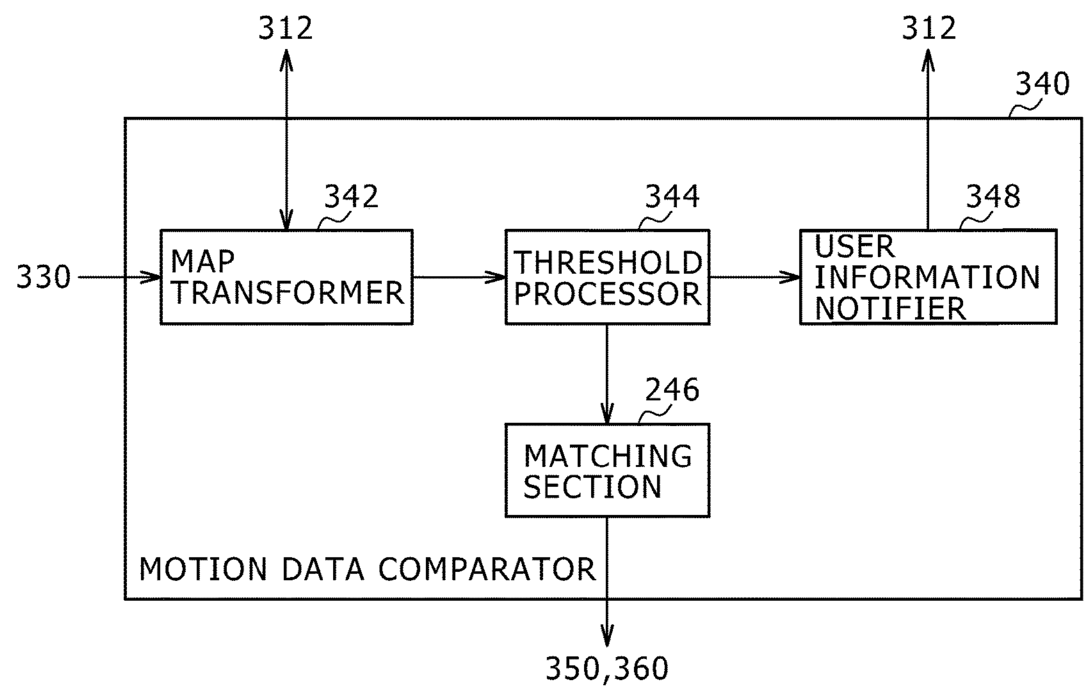
FIG. 10 is a diagram schematically showing the internal configuration of a motion data comparator according to the embodiment.

FIG. 10 is a diagram schematically showing the internal configuration of the motion data comparator 340 according to the embodiment. Similarly to the motion data comparator 240, the motion data comparator 340 according to the embodiment includes a map transformer 342, a threshold processor 344, and a matching section 346. Differently from the motion data comparator 240, the motion data comparator 340 further includes a user information notifier 348.

The operation of the map transformer 342 and the threshold processor 344 is the same as that of the map transformer 242 and the threshold processor 244, respectively. Meanwhile, the motion data comparator 340 existing in the server 300 compares motion data relating to a large number of combinations of different two users. So, the matching section 346 decides the combination that should be determined to have similar motion data among the combinations of motion data acquired by the threshold processor 344 based on a real value output by the map transformer 342. Specifically, the matching section 346 selects, as the combination of similar motion data, the combination of motion data with which the real value output by the map transformer 342 is the smallest among the combinations of motion data with which the real value is smaller than the similarity decision threshold. This can enhance the possibility that the combination of the users who have actually faced each other is identified among a large number of combinations of different two users.

Based on the combinations of motion data with which the real value is smaller than the similarity decision threshold, acquired by the threshold processor 344, the user information notifier 348 acquires the combination of users corresponding to the motion data. The user information notifier 348 notifies one user configuring the acquired combination of users of information relating to the other user. As described above, if the output value of the map transformer 342 is smaller than the similarity decision threshold, the possibility that the users have performed similar actions within the predetermined time interval and within the predetermined distance is high. That is, the possibility that these users have been with each other at e.g. any party site is high and they will be candidates of friend registration. By notification of the candidate of friend registration to the respective users by the user information notifier 348, the users are allowed to save the effort of looking for a friend.

Figure 11:
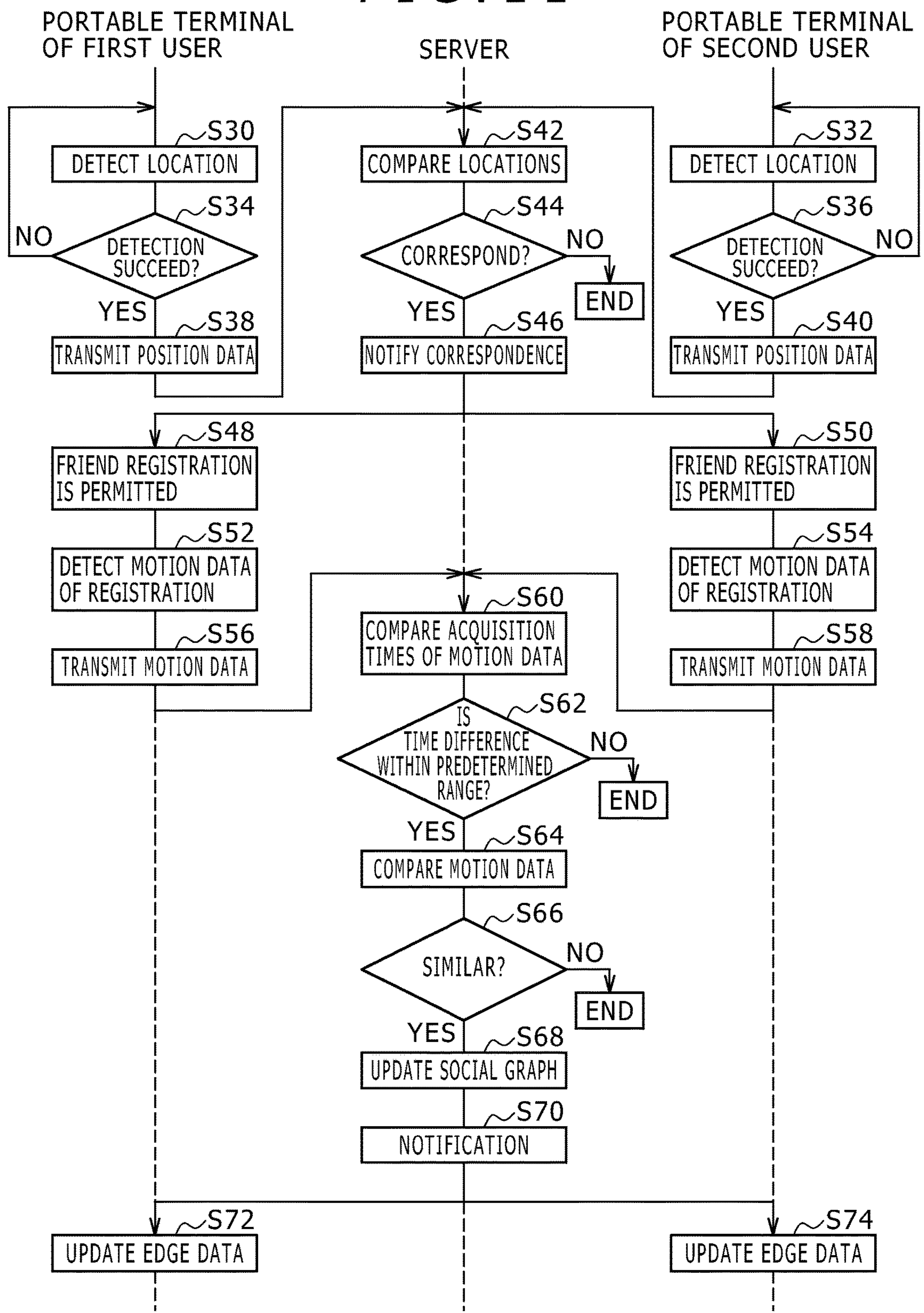
FIG. 11 is another sequence diagram for explaining the flow of information processing in the social network system according to the embodiment.

FIG. 11 is another sequence diagram for explaining the flow of information processing in the social network system 100 according to the embodiment, and is a sequence diagram when the plural portable terminals 200 and the server 300 can communicate via the network 500.

The position detector 278 in the portable terminal 200*a* of the first user attempts to detect the present location (S30). The position detector 278 in the portable terminal 200*b* of the second user also attempts to detect the present location (S32). If the detection of the location results in failure (N of S34), the portable terminal 200*a* of the first user returns to the step S30 to continue the detection of the location. The portable terminal 200*b* of the second user also returns to the step S32 to continue the detection of the location if the detection of the location results in failure (N of S36).

If succeeding in the detection of the location (Y of S34), the portable terminal 200*a* transmits position data to the server 300 via the network 500 (S38). The portable terminal 200*b* also transmits position data to the server 300 via the network 500 (S40) if succeeding in the detection of the location (Y of S36).

The distance acquirer 390 of the server 300 compares the respective position data received from the portable terminal 200*a* and the portable terminal 200*b* (S42). If the locations of the portable terminal 200*a* and the portable terminal 200*b* are within a predetermined distance from each other as the result of the comparison, i.e. if it can be considered that the locations of the portable terminal 200*a* and the portable terminal 200*b* correspond with each other (Y of S44), the server 300 notifies the portable terminal 200*a* and the portable terminal 200*b* of that the locations correspond with each other (S46). If the locations of the portable terminal 200*a* and the portable terminal 200*b* do not correspond with each other as the result of the comparison (N of S44), the processing relating to the portable terminal 200*a* and the portable terminal 200*b* ends.

Upon receiving the notification that the locations of the portable terminal 200*a* and the portable terminal 200*b* correspond with each other from the server 300, the portable terminal 200*a* becomes a state of being capable of friend registration with the portable terminal 200*b* (S48). Similarly, upon receiving the notification that the locations of the portable terminal 200*a* and the portable terminal 200*b* correspond with each other from the server 300, the portable terminal 200*b* also becomes a state of being capable of friend registration with the portable terminal 200*a* (S50).

Upon becoming the state of being capable of friend registration with the portable terminal 200*b*, the portable terminal 200*a* attempts to detect motion data of registration (S52). Similarly, the portable terminal 200*b* also attempts to detect the motion data of registration (S54) upon becoming the state of being capable of friend registration with the portable terminal 200*a*. When detecting the motion data of registration, the portable terminal 200*a* associates the detected motion data with the detection time and transmits it to the server 300 (S56). Similarly, the portable terminal 200*b* also transmits the detected motion data with the detection time to the server 300 (S58).

The time interval acquirer 330 in the server 300 compares the times that are acquired from the portable terminal 200*a* and the portable terminal 200*b* and are associated with the motion data (S60). If the difference between the times that are acquired from the portable terminal 200*a* and the portable terminal 200*b* and are associated with the motion data is not within the predetermined time interval (N of S62), the processing relating to the portable terminal 200*a* and the portable terminal 200*b* ends.

If the difference between the times that are acquired from the portable terminal 200*a* and the portable terminal 200*b* and are associated with the motion data is within the predetermined time interval (Y of S62), the motion data comparator 340 compares the motion data acquired from the portable terminal 200*a* and the portable terminal 200*b* (S64). If the motion data are dissimilar as the result of the comparison (N of S66), the processing relating to the portable terminal 200*a* and the portable terminal 200*b* ends.

If the motion data acquired from the portable terminal 200*a* and the portable terminal 200*b* are similar as the result of the comparison by the motion data comparator 340 (Y of S66), the operation executor 360 in the server 300 updates the social graph stored in the SNS database 400 (S68). Furthermore, the server 300 notifies the portable terminal 200*a* and the portable terminal 200*b* of that operation of friend registration has occurred (S70). Upon receiving the notification from the server 300, the portable terminal 200*a* updates edge data relating to the portable terminal 200*b* (S72). Similarly, the portable terminal 200*b* updates edge data relating to the portable terminal 200*a* upon receiving the notification from the server 300 (S74).

As described above, by the social network system 100 according to the embodiment, a technique to assist operation in the social network system can be provided.

The present disclosure is described above based on the embodiment. It is understood by those skilled in the art that the embodiment is exemplification and various modification examples can be made regarding the combination of the respective constituent elements and respective processing processes thereof and these modification examples are also within the scope of the present disclosure.

First Modification Example

In the above, explanation is made with reference to FIG. 11 about the case in which the server 300 carries out matching of motion data and so forth when the plural portable terminals 200 and the server 300 can communicate via the network 500. This is, so to speak, equivalent to the case in which the plural portable terminals 200 and the server 300 connect to execute processing online in real time. On the other hand, the server 300 may execute processing of matching of motion data and so forth offline.

Also in this case, processing similar to that of the case of executing processing online in real time is executed. The portable terminals 200 each transmit acquired motion data to the server 300 when becoming a state of being connectable to the server 300 via the network 500. About each of the motion data received from the portable terminals 200, the server 300 makes comparisons as to whether or not the motion data are similar for the combinations of motion data that are within the above-described predetermined time interval and within the predetermined distance. Due to this, even in a situation in which the portable terminal 200 is not in an environment in which it can use a network and therefore cannot communicate with other portable terminals 200 and the server 300, the server 300 can be made to execute operation in the social network system, such as friend registration, by posteriori transmission of motion data to the server 300.

Second Modification Example

In the above, explanation is made about the case in which friend registration between different two users is mainly carried out as an example of operation in the social network system. The example of operation in the social network system is not limited to operation between different two users. Besides it, the example may be e.g. operation relating to one user. This case will be described below.

Figure 12:
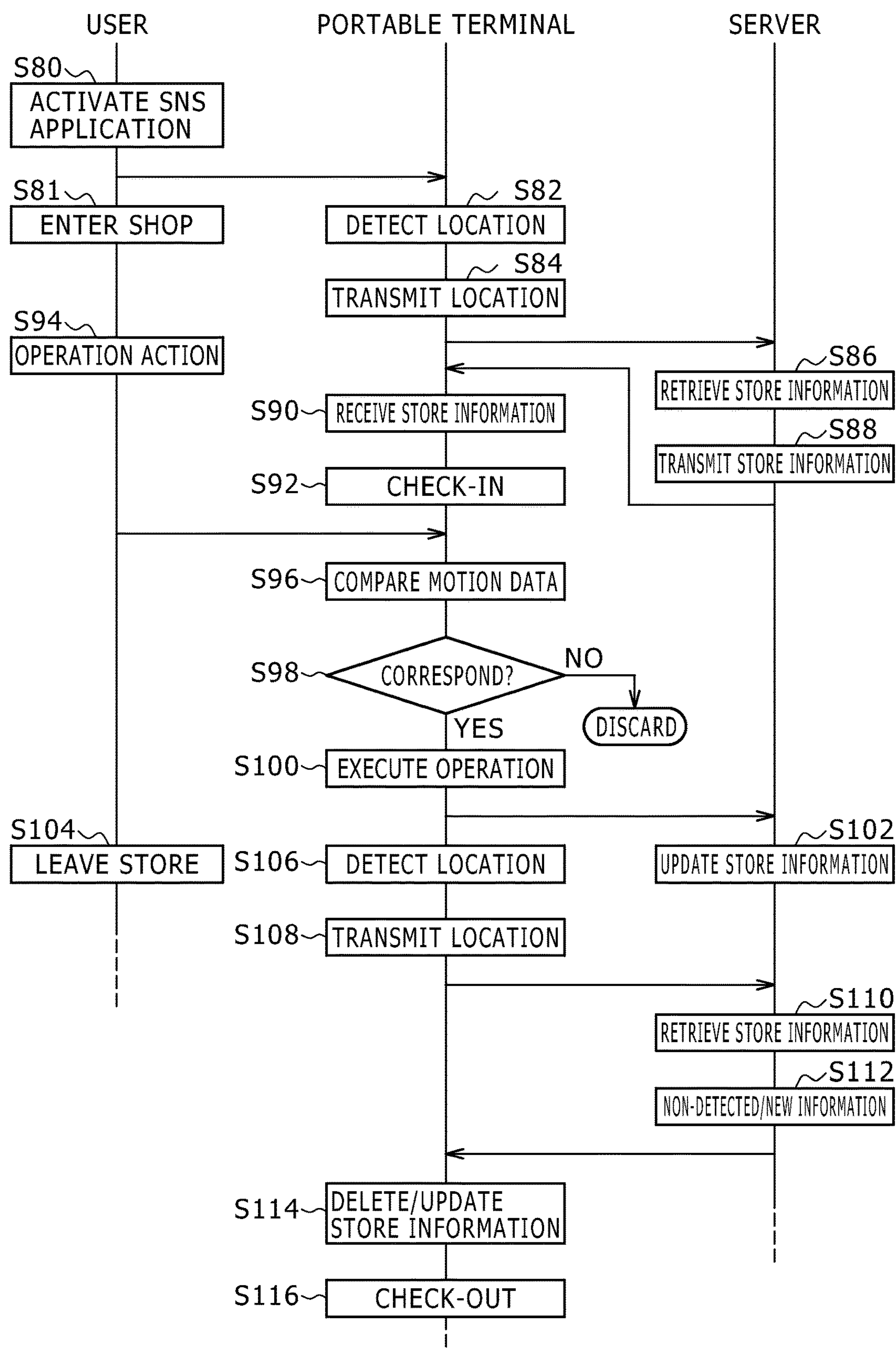
FIG. 12 is further another sequence diagram for explaining the flow of information processing in the social network system according to the embodiment.

FIG. 12 is further another sequence diagram for explaining the flow of information processing in the social network system 100 according to the embodiment, and is a sequence diagram of the case of assisting operation relating to one user. Specifically, the example shown in FIG. 12 is an example of the case of assisting operation in social network service that links a user and facilities such as stores utilized by the user by utilizing position information of the user.

A user who uses the portable terminal 200 activates an SNS application that operates on the portable terminal 200 (S80). The user enters a certain store with the SNS application activated (S81). The SNS application detects the location of the user by utilizing the position detector 278 (S82). The SNS application transmits the detected location to the server 300 via the network 500 (S84).

Based on the received location, the server 300 searches the SNS database 400 to retrieve information on the store corresponding to the location of the user (S86). The server 300 transmits the retrieved store information to the SNS application operating on the portable terminal 200 (S88).

The SNS application receives the store information from the server 300 (S90). The SNS application executes check-in to this store based on the received store information (S92). Here, the "check-in" means operation of registering information that the user is present at a specific store in the social network service utilized by the user.

The user performs a predetermined operation action at the store the user has entered (S94). Here, the "predetermined operation action" is a favorite registration action defined in order to register the store the user has entered in the favorites in the social network service utilized by the user and can be decided in advance. An example of the favorite registration action is swinging the hand part on which the wristband-type measuring part 212 is mounted twice.

The SNS application makes a comparison as to whether or not motion data acquired by the acceleration sensor 272 is similar to the favorite registration action (S96). If the motion data is dissimilar to the favorite registration action as the result of the comparison, the SNS application discards the motion data. If the motion data is similar to the favorite registration action, the SNS application executes favorite operation (S100).

When receiving information indicating that the favorite operation is executed from the SNS application via the network 500, the server 300 updates the store information stored in the SNS database (S102). Specifically, the server 300 increases the number of users who register this store as the favorites and posts the link to this store on a personal page in the social network service utilized by the user.

Supposing that thereafter the user leaves the store (S104), the SNS application detects the location of the user again by utilizing the position detector 278 (S106). Furthermore, the SNS application transmits the detected location to the server 300 (S108). The server 300 retrieves store information again based on the received location (S110). If the store information cannot be detected or information on a different new store is detected as the result of the retrieval, the server 300 transmits the non-detected result or new information to the SNS application operating on the portable terminal 200 (S112).

Upon receiving the non-detected result or new information from the server 300, the SNS application deletes the store information or updates it by the new store information (S114). In either case, the SNS application executes check-out from the store to which the SNS application has checked-in (S116). By the above, the operation relating to one user in the social network system can be executed.

Third Modification Example

In the above description, explanation is made about the case in which the motion data comparator 240 is triggered to compare motion data of the first user with motion data of the second user by that the gain of sound information acquired by the sound information acquirer 274 surpasses a predetermined threshold. In addition to this configuration, a noise canceller function to reduce the ambient sound from the sound information acquired by the sound information acquirer 274 may be provided. In this case, this function can be realized e.g. by providing a noise reducer (not shown) in the motion data analyzer 220 and using a known noise canceller technique based on a signal of the sound information acquired by the sound information acquirer 274 and a signal detected from a microphone (not shown) of the smartphone 202. This can alleviate the situation in which, when the environment is noisy, the gain of sound information surpasses the threshold of the sound volume only by noise. By acquiring reference information at the time of noise cancel from the microphone of the smartphone 202, the need to additionally provide a component for acquiring the reference information is also eliminated, which is advantageous also in terms of the cost and weight reduction.

Fourth Modification Example

In the above description, explanation is made mainly about the case in which the motion data comparator 340 compares motion data of the first user with motion data of the second user. The motion data as the target of comparison with the motion data of the first user by the motion data comparator 340 is not limited to the motion data of the second user acquired by the portable terminal possessed by the second user. Besides it, the motion data may be one stored in a database in advance as comparative motion data. This case will be described below.

FIG. 13 is a diagram schematically showing the data structure of a comparison database 600 in which the comparative motion data is stored according to the embodiment. In the example shown in FIG. 13, patterns of N kinds (N≥1) of motion data from a first pattern to an N-th pattern are registered as the comparative motion data. The first pattern is e.g. a motion pattern of a hand part when the user performs a handshake and the second pattern is a motion pattern of a hand part when the user performs high five. Besides them, motion data assumed as the comparison target of the motion data comparator 340, such as a motion pattern of the neck part when the user nods and a motion pattern of a leg part when the user kneels, are measured by experiments and stored by the comparison database 600 in advance.

The specific value of the number N of motion data stored in the comparison database 600 may be defined in advance through assumption of motion data as the comparison target of the motion data comparator 340, or may be allowed to be increased and decreased through registration and deletion of motion data by the user at arbitrary timing. The comparison database 600 is stored in another database (not shown) accessible by the SNS database 400 or the server 300, and the portable terminal 200 can access the comparison database 600 via the server 300 and the network 500 and perform download to the recording section 216 in the portable terminal 200.

The motion data comparator 340 compares motion data of the first user acquired by the motion data acquirer 210 with the plural motion data stored in the comparison database 600 to acquire the most similar motion data from the plural motion data. This can be realized through use of e.g. the algorithm of the above-described DP matching by the motion data comparator 340.

If the kind of the motion data that is the most similar to the motion data of the first user is the above-described favorite registration action as the result of the comparison by the motion data comparator 340, the operation executor 360 executes the favorite operation.

Fifth Modification Example

In the above-described fourth modification example, explanation is made about the case in which the motion data comparator 340 compares motion data of the first user acquired by the motion data acquirer 210 with one or plural motion data stored in the comparison database 600. The motion data comparator 340 may compare not only motion data of the first user but also motion data of the second user with the plural motion data stored in the comparison database 600, and the operation executor 360 may execute operation to the social network service utilized by the first user and the second user in common based on the results of the two comparisons carried out by the motion data comparator 340. This case will be described below.

FIG. 14 is a diagram schematically showing the data structure of a combination pattern database 700 in which combinations of patterns of motion data are stored according to the embodiment. As shown in FIG. 14, the combination pattern database 700 stores combinations of motion pattern of the first user and motion pattern of the second user and contents meant by the combinations in association with each other.

For example, suppose that motion data of the first user matches the first pattern and motion data of the second user also matches the first pattern as the result of the comparison by the motion data comparator 340. As shown in FIG. 14, the combination of the first pattern and the first pattern is so stored as to be associated with a handshake by the two users in the combination pattern database 700. The motion data comparator 340 refers to the combination pattern database 700 based on the comparison result of the motion data of the first user and the comparison result of the motion data of the second user to acquire a result indicating that the two users have performed a handshake. The operation executor 360 acquires the result indicating that the two users have performed a handshake from the motion data comparator 340, and executes friend registration of these two users in the social network service utilized by the two users in common for example.

For example, when the first user salutes to the second user or when the first user kneels to the second user, motion data of the first user is different from motion data of the second user. The kinds of combinations stored by the combination pattern database 700 in this manner may be arbitrary combinations of the motion data stored in the comparison database 600. Reference to the comparison database 600 and the combination pattern database 700 by the motion data comparator 340 is more effective compared with the case of directly comparing motion data of the first user with motion data of the second user, in that actions of more users can be treated.

It is also possible to allow the combinations of motion data stored by the combination pattern database 700 to be increased and decreased through registration and deletion of motion data by the user at arbitrary timing. The combination pattern database 700 is stored in another database (not shown) accessible by the SNS database 400 or the server 300, and the portable terminal 200 can access the combination pattern database 700 via the server 300 and the network 500 and perform download to the recording section 216 in the portable terminal 200.

The present disclosure contains subject matter related to that disclosed in Japanese Priority Patent Application JP 2013-003282 filed in the Japan Patent Office on Jan. 11, 2013, the entire content of which is hereby incorporated by reference.

What is claimed is:

1. An information processing device comprising:

a motion data acquirer that starts to acquire motion vector data of a first user and a second user when the following conditions occur: (i) the first and second users are within a predetermined proximity of one another, and (ii) sound above a predetermined volume threshold is generated by the first user or the second user;

a motion data comparator that is configured to compare the motion vector data of the first user with the motion vector data of the second user acquired substantially contemporaneously with, or within a predetermined time interval from, the first user's motion vector data, and uses a resulting comparison of the data to determine whether or not the motion of the first user and second user are similar, thereby suggesting an agreement to interact with each other; and an operation executor that executes a predetermined operation on a social network service utilized by the first and second users based on the resulting comparison of the motion data comparator.

2. The information processing device according to claim 1, wherein the motion data comparator refers to a comparison database that stores at least one motion vector data defined in advance as the comparative motion vector data to acquire motion vector data most similar to the motion vector data acquired by the motion data acquirer from the motion data stored in said database, and the operation executor executes operation to the social network service utilized by the user based on a kind of the motion vector data most similar to the motion vector data acquired by the motion data acquirer.

3. The information processing device according to claim 1, wherein the motion data acquirer acquires also motion vector data of another user different from the user, and the motion data comparator treats the motion vector data of the another user as the comparative motion vector data and compares it with the motion vector data of the user.

4. The information processing device according to claim 3, wherein the motion data acquirer acquires motion vector data of another user different from the user via an ad hoc network.

5. The information processing device according to claim 3, wherein the motion data acquirer acquires motion vector data of another user different from the user via an infrastructure network; and the motion data comparator compares the motion vector data when a calculated distance between the user and the another user is within a predetermined distance.

6. The information processing device according to claim 1, wherein the motion data acquirer is so configured as to be freely mounted on each of the first and second users and measures motion vector data of the first and second users.

7. The information processing device according to claim 1, wherein said conditions further comprise: the first user and second user are facing each other.

8. The information processing device according to claim 1, wherein said predetermined operation on the social network is a friend registration.

9. The information processing device according to claim 1, wherein said predetermined operation is an instruction to update graph data relating to the first user and the second user in a social networking service database.

10. The information processing device according to claim 1, wherein the motion data comparator is configured to compare a time associated with measuring the motion of the first user with a time associated with measuring the motion of the second user.

11. The information processing device according to claim 1, wherein said motion data comparator is configured to identify the motion data as a handshake.

12. The information processing device according to claim 1, wherein said motion data comparator is configured to identity the motion data as the first user and second user slapping each other's hand.

13. An information processing method comprising:

starting to acquire motion vector data of a first user and a second user when the following conditions occur: (i) the first and second users are within a predetermined proximity of one another, and (ii) sound above a predetermined volume threshold is generated by the first or second user;

comparing the acquired motion vector data of the first user with motion vector data of the second user that was acquired substantially contemporaneously with or within a predetermined time period from the acquired motion vector data of the first user, and using the resulting comparison to determine whether or not the motion of the first and second user are similar, thereby suggesting an agreement to interact with each other; and executing predetermined operation to social network service utilized by the first and second users based on a comparison result.

14. A non-transitory, computer readable recording medium containing a computer program, which when executed by a processor, causes the processor to carry out a procedure comprising:

starting to acquire motion vector data of a first user and a second user when the following conditions occur: (i) the first and second users are within a predetermined proximity of one another, and (ii) sound above a predetermined volume threshold is generated by the first or second user;

comparing the acquired motion vector data of the first user with the motion vector data of the second user that was acquired substantially contemporaneously with, or within a predetermined time interval from the acquired motion vector data, and using the comparison to determine whether or not the motion of the first user and second user are similar, thereby suggesting an agreement to interact with each other;

determining based on the comparison of the motion vector data whether or not the first user and the second user are acknowledging agreement to interact with each other, and executing a predetermined operation on a social network service utilized by the first and second users based on a comparison result.

15. A portable terminal comprising:

a measuring part that is so configured as to be freely mounted on a user and measures motion vector data of the user, wherein the measuring part starts to measure motion vector data when the following conditions occur: (i) a first and second user, each wearing the measuring part, are within a predetermined proximity of one another, and (ii) sound above a predetermined volume threshold is generated by the first or second user;

an ad hoc communication section that acquires, via an ad hoc network, motion vector data obtained by measuring the motion of the first and second users who both utilize a same social network service;

computing resources configured to calculate a time difference between a time when the measuring part has measured motion vector data of the first user and a time associated with the motion vector data of the second user acquired by the ad hoc communication section;

a motion data comparator that determines whether or not the motion vector data of the first user and the motion vector data of the second user are similar based on the calculated time difference being within a predetermined time interval and determines whether or not the first user and the second user are acknowledging agreement to interact with each other; and an operation executor that executes a predetermined operation on a social network service utilized by the first user and the second user when the motion vector data of the first and second users are similar.

16. The portable terminal according to claim 15, further comprising a time stamp giving section that stores a time when the ad hoc communication section has acquired the motion vector data of the second user in association with the motion vector data of the second user, wherein the time difference is calculated between the time when the measuring part has acquired the motion vector data of the first user and the time stored by the time stamp giving section.

17. The portable terminal according to claim 15, further comprising a sound information acquirer that acquires a sound issued by at least one of the first user and the second user as sound information, wherein the motion data comparator is triggered to compare the motion vector data of the first user with the motion vector data of the second user by that gain of the sound information acquired by the sound information acquirer acquiring a sound having a predetermined threshold of volume.

18. The portable terminal according to claim 17, wherein the measuring part is attached to the first user and is separate from the portable terminal, and the measuring part includes the sound information acquirer, an acceleration sensor that measures a motion of the first user, a transmitter/receiver that transmits information measured by the acceleration sensor to the electronic apparatus and acquires information transmitted from the electronic apparatus, and a notifier that provides information acquired via the transmitter/receiver.

19. The portable terminal according to claim 18, wherein when the motion vector data of the first user and the motion vector data of the second user are dissimilar, the motion data comparator transmits information indicating that the motion vector data are dissimilar to the transmitter/receiver, and when the transmitter/receiver receives the information indicating that the motion vector data of the first user and the motion vector data of the second user are dissimilar, the notifier makes a notification by using predetermined visual information or audio information defined in order to convey the information to the first user.

20. The portable terminal according to claim 15, further comprising a modifying action detector that analyzes the motion vector data of the first user acquired by the measuring part in a predetermined time after execution of operation by the operation executor, and detects whether or not the motion vector data is similar to an operation modifying action defined in order to decide whether or not to modify an operation by the operation executor, wherein the operation executor executes a predetermined modifying operation to the social network service utilized by the first user and the second user in common when the modifying action detector detects motion vector data similar to the operation modifying action.

21. The portable terminal according to claim 15 wherein the measuring part is so configured as to be freely mounted on a wrist of the first user.

22. The portable terminal of claim 15, wherein said measuring part comprises one or more wearable sensors.

23. The portable terminal of claim 22, wherein at least one of said wearable sensors is a wristband.

24. The portable terminal of claim 15, wherein the measuring part comprises a transceiver, an acceleration sensor, a sound information acquirer, and a notifier.

25. The portable terminal of claim 24, wherein said notifier causes an LED to blink and generates a beep sound to notify one of said first or second user to shake hands with the other of said first or second user.

26. A server capable of communication with at least two portable terminals each possessed by a respective one of at least two users via a network, the server comprising:

computing resources configured to start to acquire:

motion vector data of a first user and a second user measured by each of the at least two portable terminals when the following conditions occur: (1) the first and second users are within a predetermined proximity of one another, and (2) sound above a predetermined volume threshold is generated by the first or second user;

a time interval between measurement of motion vector data of the first user and measurement of motion vector data of the second user;

distance between locations of the first and second users;

a motion data comparator that determines whether or not the motion vector data of the first and second users are similar based on the time interval acquired being within a predetermined time interval and the distance acquired being within a predetermined distance, thereby indicating that the first and second users agree to interact with each other; and an operation executor that executes predetermined operation to social network service utilized by the different two users in common when the motion vector data of the different two users are similar.

27. The server according to claim 26, that is further configured to calculate a time difference between times given when the portable terminals possessed by the first and second users have measured the motion vector data.

28. The server according to claim 26, wherein the motion data comparator receives motion vector data of different two users as an input and, when the motion vector data of the different two users are similar, outputs a smaller real value compared with when the motion vector data are dissimilar, compares the real value output with a similarity decision threshold defined in order to decide whether or not the motion vector data of the different two users are similar, to acquire combinations of motion vector data with which the real value output is smaller than the similarity decision threshold, and decides a combination of similar motion vector data from the combinations of motion vector data acquired based on the real value output.

29. The server according to claim 28, wherein the motion data comparator selects a combination of motion vector data with which the real value output is smallest as the combination of similar motion vector data.

30. The server according to claim 28, further configured to acquire a combination of users corresponding to the motion vector data with which the real value is smaller than the similarity decision threshold based on the combinations of the motion vector data, and notifies one user configuring the combination of users of information relating to the other user.

* * * * *